United States Patent
Martin

(10) Patent No.: US 6,950,023 B1
(45) Date of Patent: Sep. 27, 2005

(54) CONTACT-FREE ELECTRONIC LABEL FOR PRODUCT WITH CONDUCTIVE SURFACE

(75) Inventor: Philippe Martin, Beaune (FR)

(73) Assignee: Gemplus, Gemenos Cedex (FR)

( * ) Notice: Subject to any disclaimer, the term of this patent is extended or adjusted under 35 U.S.C. 154(b) by 0 days.

(21) Appl. No.: 10/381,022

(22) PCT Filed: Sep. 11, 2001

(86) PCT No.: PCT/FR01/02813
§ 371 (c)(1),
(2), (4) Date: Sep. 22, 2003

(87) PCT Pub. No.: WO02/25583
PCT Pub. Date: Mar. 28, 2002

(30) Foreign Application Priority Data
Sep. 22, 2000 (FR) .............................. 00/12092

(51) Int. Cl.⁷ .............................................. G08B 13/14
(52) U.S. Cl. ................ 340/572.7; 340/572.8; 340/572.1; 340/572.2; 340/572.3; 340/572.4; 340/572.5
(58) Field of Search .................... 340/572.7, 572.8, 340/572.1, 572.2, 572.3, 572.4, 572.5

(56) References Cited

U.S. PATENT DOCUMENTS

| | | | |
|---|---|---|---|
| 5,552,790 A | | 9/1996 | Gunnarsson |
| 5,574,470 A | | 11/1996 | de Vall |
| 5,995,006 A | * | 11/1999 | Walsh ...................... 340/572.7 |
| 6,049,278 A | | 4/2000 | Guthrie et al. |
| 6,154,137 A | * | 11/2000 | Goff et al. ............... 340/572.4 |
| 6,486,780 B1 | * | 11/2002 | Garber et al. ............ 340/572.1 |
| 6,646,554 B1 | * | 11/2003 | Goff et al. ............... 340/572.6 |

FOREIGN PATENT DOCUMENTS

| | | |
|---|---|---|
| DE | 19542900 | 5/1997 |
| EP | 0704816 | 4/1996 |
| WO | WO 98/23971 | 6/1998 |
| WO | WO 00/21031 | 4/2000 |

* cited by examiner

*Primary Examiner*—Jeffery Hofsass
*Assistant Examiner*—Daniel Previl
(74) *Attorney, Agent, or Firm*—Buchanan Ingersoll PC

(57) ABSTRACT

A contact free electronic label, such as those designed to be affixed on conductive surfaces, has an insulating support one side of which bears a first winding having its ends connected to an electronic circuit. The opposite side of the support bears a second winding whose ends are connected to conductive pads. This opposite side of the support is designed to be secured to a conductive surface via an insulating dielectric layer. The labels are designed to be affixed on products having conductive surfaces such as laser discs, gas bottles and the like.

6 Claims, 2 Drawing Sheets

CONTACT-FREE ELECTRONIC LABEL FOR PRODUCT WITH CONDUCTIVE SURFACE

This disclosure is based upon French Application No. 00/12092, filed on Sep. 22, 2000 and International Application No. PCT/FR01/02813, filed Sep. 11, 2001, the contents of which are incorporated herein by reference.

BACKGROUND OF THE INVENTION

The invention relates to contactless electronic labels which are affixed on products with a view to their identification and, more particularly, those which are intended to be affixed on products having a conductive surface.

Identifying products by "bar codes" is known, where said bar codes are printed directly on the products or on labels then stuck thereon.

These bar codes are read by an optical device when they are passed through at the cash desk and their decoding makes it possible to refer to a computer system with a view to knowing the price thereof, displaying it on a screen and adding it to the sum of the other products presented to the optical device.

One of the major drawbacks of bar codes is that they are fixed at the time of their printing and therefore do not allow tracking of the product over time, from manufacture to sale and, a fortiori, throughout the guarantee period.

Also, a proposal has been made to replace the bar codes by so-called electronic labels which comprise an electronic circuit having principally an electronic type memory for recording not only the information of a bar code but also other information relating to the "life" of the product, it being possible for certain of this additional information to be modified or updated during this life.

In simpler applications, the electronic labels are used as an anti-theft device by activating an alarm when the product goes past gates without having previously been presented at the cash desk for payment, the passage through at the cash desk with payment having the effect of deactivating the alarm.

Whatever the envisaged application, an electronic label 10 for contactless reading comprises (FIG. 1) an antenna 12 associated with an electronic circuit 14 in the form of an integrated circuit referred to as an electronic chip. The antenna 12 is implemented by a tuned circuit which consists of a coil 16 and a capacitor 18, the capacitor forming part of the electronic circuit 14.

The coil 16 is formed by a few turns 20 (FIG. 2) disposed on an insulating sheet 22, the ends 24 and 26 of the winding of the turns being connected to the terminals of the capacitor 18 disposed inside the electronic circuit. The electronic chip 14 is stuck onto the sheet 22.

Such an electronic label is read during its passage in front of a reading device which emits electromagnetic radiation detected by the antenna 12.

The signal emitted by the reading device comprises a high frequency signal which is modulated, for example amplitude modulated, by a low frequency signal which conveys the information to be transmitted, for example an instruction for reading the electronic memory.

The high frequency signal, for example at a frequency of 13.56 MHz, detected by the antenna 12 is used, after rectification and filtering, to supply the electronic circuit 14 with electrical energy whilst the low frequency signal is used, after demodulation and decoding, to recognise the instruction.

The instruction can consist of reading the electronic memory with a view to transmitting all or part of its content to the reading device by means of the antenna 12 which continues to receive a high frequency signal which is unmodulated but the load of which varies depending on a modulated signal representing the content of the memory read.

There results therefrom a modulation of the magnetic coupling between the antenna 12 and the antenna of the reading device which is detected and decoded by the latter.

The electronic label 10 is secured, for example by gluing, to the product to be identified or its packaging by means of the insulating sheet 22.

This type of electronic label, referred to as passive since it is powered by the energy of the high frequency signal, operates perfectly when the support of the electronic label is not electrically conductive but its operation is impaired, perhaps even impossible, when the support is made from an electrically conductive material since the electromagnetic radiation is absorbed by the conductive material of the support in the form of Foucault currents, so that the antenna of the electronic label no longer detects any signal and is obviously not supplied with energy by the high frequency signal.

In the case of a conductive support, a proposal has been made to use so-called active electronic labels which are supplied with electronic energy by a battery and which then operate as radiofrequency emitters. Such electronic labels, which are for example used on motor vehicle assembly lines, are bulky and expensive and can therefore not be fixed on small and/or inexpensive products.

SUMMARY OF THE INVENTION

An intermediate solution consists of moving the electronic label away from its conductive support by affixing it, for example, on the product packaging, which has the drawback of separating the electronic label from the product itself. This is for example the case of products such as so-called "laser" disks, that is to say those recorded and read by laser beam, these diskettes having a conductive surface on one side.

An aim of the present invention is therefore to produce an electronic label which can be secured to a conductive support. This conductive support can be, for example, the conductive surface of a laser disk or the outer metal wall of a gas bottle or else a metallic spare part.

The invention therefore relates to a contactless electronic label intended to be secured to a conductive surface, characterised in that it comprises an electrically insulating support, where one face bears an integrated circuit associated with a first conductive antenna winding for producing a contactless electronic label, and where the opposite face of said insulating support bears a second conductive winding having each end connected to a conductive pad, said opposite face being intended to be secured to said conductive surface by means of an insulating dielectric layer.

The insulating support can comprise two insulating supports, the opposite faces of which are secured to one another, for example, by an insulating adhesive layer.

The insulating dielectric layer in contact with the conductive surface is an adhesive layer. This adhesive layer is covered with a detachable protective sheet.

The tuned circuit comprising the first conductive antenna winding and the tuned circuit comprising the second conductive winding have tuned frequencies which are very close to one another.

BRIEF DESCRIPTION OF THE DRAWINGS

Other characteristics and advantages of the present invention will emerge from a reading of the following description of one particular embodiment, said description being given in connection with the accompanying drawings in which.

DETAILED DESCRIPTION

Figure 1:
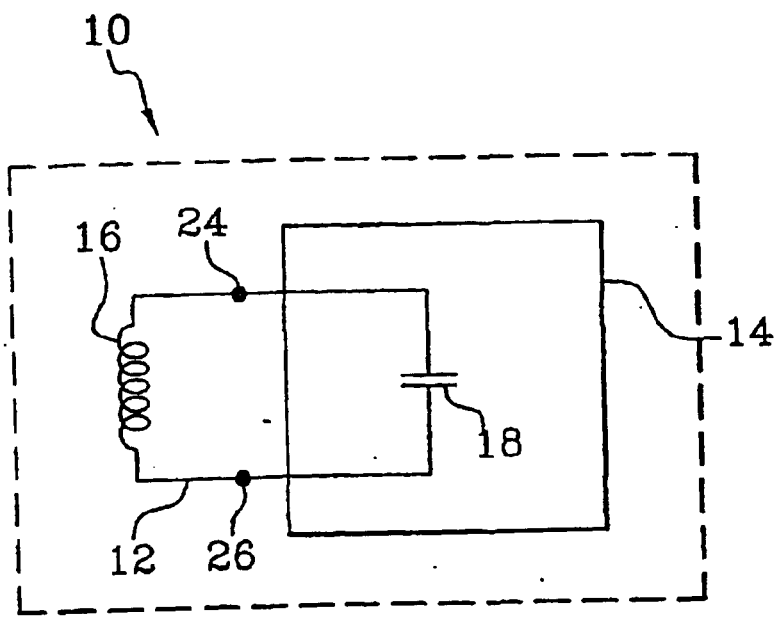
FIG. 1 is a functional diagram of a contactless electronic label according to the prior art.
Figure 2:
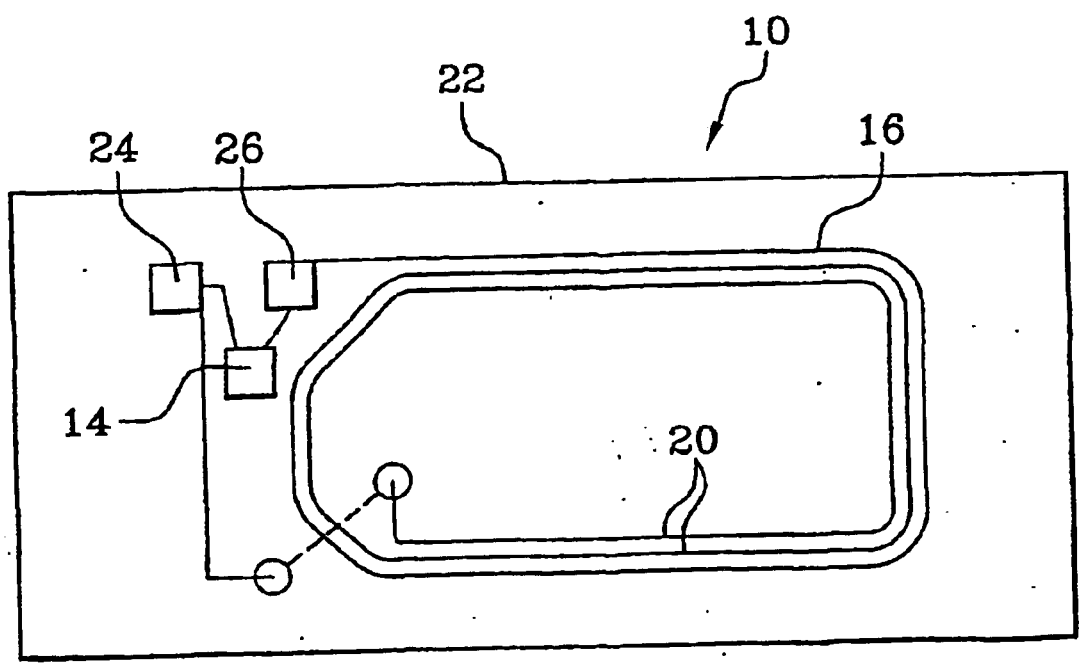
FIG. 2 is a top view of a contactless electronic label according to the prior art.

FIGS. 1 and 2 have been described in the preamble in order to define a contactless electronic label of the prior art intended to be secured to a product whose outer wall is not conductive.

In order to be secured onto a wall made from conductive material, this label of the prior art must be modified according to the invention in order to incorporate therein a winding and two conductive pads each connected to one end of the winding, the winding and the conductive pads being disposed on the side of the insulating support opposite to that which carries the antenna winding and the electronic chip 14. It is this opposite side which is intended to be secured to the wall made from conductive material of the product to be labelled by means, for example, of an insulating adhesive layer.

Figure 3:
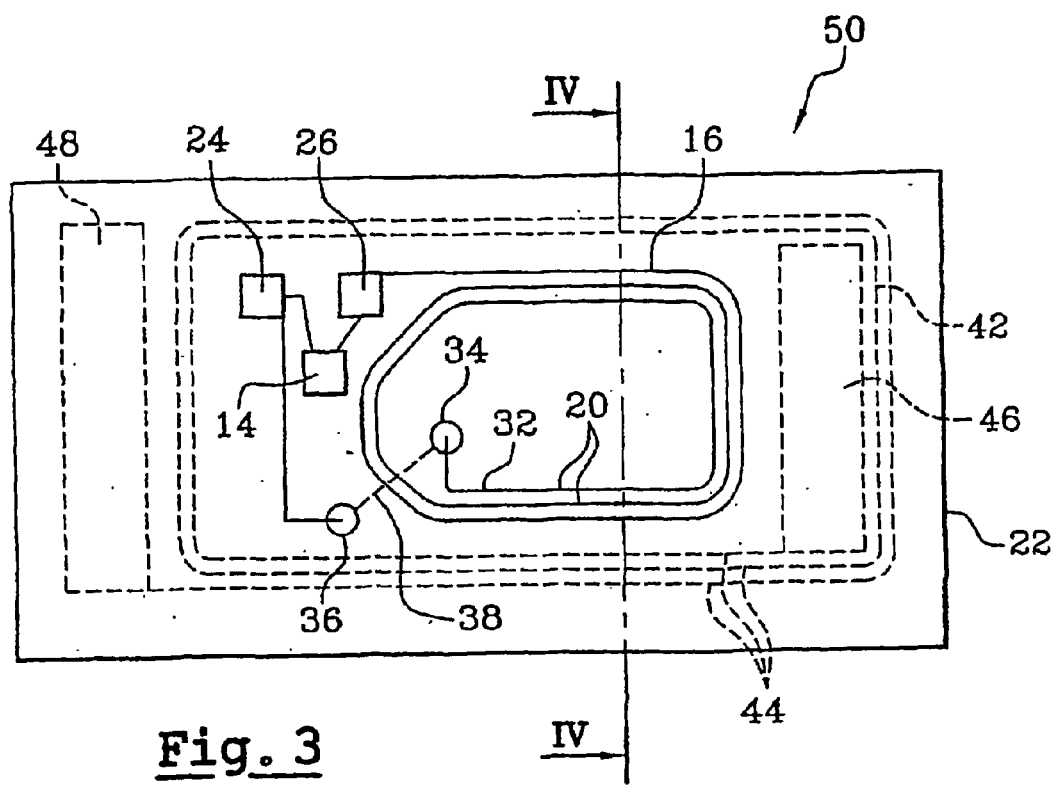
FIG. 3 is a top view of a contactless electronic label according to the invention.
Figure 4:
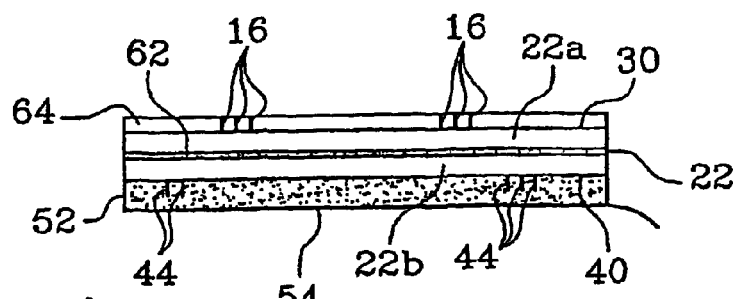
FIG. 4 is a sectional view along the line IV—IV of FIG. 3.
Figure 5:
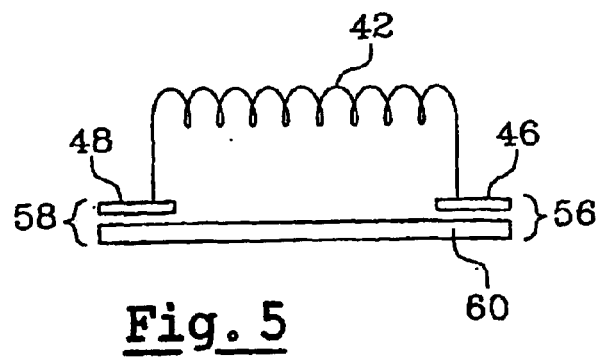
FIG. 5 is a diagram showing the electrical implementation of the tuned circuit using the metal surface of the product as one of the plates of the tuning capacitor.

More precisely, as shown in the diagrams of FIGS. 3 and 4 in which an insulating support 22, for example made from polyethylene, is used on one side 30 as a support for a planar winding 16 of conductive turns 20.

The ends 24 and 26 of the winding 16 are connected to the input terminals of the electronic chip 14. The end 26 is the outer end of the winding whilst the end 24 is connected to the inner end 32 by means of conductive pads 34 and 36 passing through the support 22 and a conductive bridge 38 connecting the pads 34 and 36.

The side 40 of the support 22, opposite to the side 30, is used as a support for a planar winding 42 of a few conductive turns 44. The turns 44 surround those 20 of the winding 16 but this arrangement is not necessary.

Each end of the winding 42 is connected to a conductive pad 46 or 48 of large surface area situated one 46 inside the turns 44 and the other 48 inside the turns 44.

The product which has just been described in connection with FIGS. 3 and 4 constitutes a contactless electronic label 50 according to the invention. Such a label 50 is then secured to the outer conductive wall of the product to be labelled by means of a layer of insulating adhesive 52.

Preferably, this adhesive insulating layer 52 is disposed on the side 40 of the support 22, and then protected by a sheet of silicone-treated paper 54.

This sheet of silicone-treated paper 54 is detached from the label 50 before applying the side 40, coated with the insulating adhesive layer 52, onto the outer conductive wall of the product to be labelled.

As a result of this sticking by means of an insulating adhesive layer 52, two capacitors 56 and 58 are created respectively between the conductive pads 46 and 48 and the conductive wall 60. These capacitors 56 and 58 constitute with the winding 42 a tuned circuit 66, the tuned frequency of which is close to that of the tuned circuit 12 of the antenna of the electronic chip 14 and comprising the winding 16.

By way of example, the tuned frequency of the tuned circuit comprising the winding 16 is about 14 MHz whilst that of the tuned circuit 66 comprising the winding 42 is about 16 MHz.

The label 50 according to the invention uses the same insulating support 22 for bearing on one side 30 the chip 14 and the antenna 16 and on the opposite side 40 a winding 42 and conductive pads 46 and 48. However, it is possible to separately manufacture, on the one hand, the conventional contactless electronic label on the insulating support 22 and, on the other hand, the winding 42 and the pads 46 and 48 on another insulating support. In order to produce the electronic label according to the invention, all that is then required is to assemble the two insulating sheets by their winding-free face by means of an adhesive layer.

In the diagram of FIG. 4, that amounts to splitting the sheet 22 into two parts 22a and 22b along the thickness and inserting an insulating adhesive layer 62 between the two split parts.

As a guide, the turns 20, 44 have a thickness of 10 $\mu$m to 20 $\mu$m, the insulating support 22 has a thickness of about 25 $\mu$m, and the adhesive layer 52 has a thickness of 75 $\mu$m.

What is claimed is:

1. A contactless electronic label intended to be secured to a conductive surface comprising an electrically insulating support having one face that bears an integrated circuit associated with a first conductive antenna winding for producing a contactless electronic label, and an opposite face that bears a second conductive winding having each end connected to a conductive pad said opposite face being adapted to be secured to said conductive surface by means of an insulating dielectric layer.

2. A contactless electronic label according to claim 1, wherein said insulating support comprises two insulating supports having opposed faces which are secured to one another.

3. A contactless electronic label according to claim 2, wherein the opposing faces of the two insulating supports are secured to one another by an insulating adhesive layer.

4. A contactless electronic label according to claim 1, wherein the insulating dielectric layer is an adhesive layer.

5. A contactless electronic label according to claim 4, wherein said adhesive layer is covered with a detachable protective sheet.

6. A contactless electronic label according to claim 1, wherein a tuned circuit comprising the first conductive antenna winding and a tuned circuit comprising the second conductive winding have tuned frequencies which are close to one another.

* * * * *